United States Patent
Weidinger

(10) Patent No.: US 12,308,201 B2
(45) Date of Patent: May 20, 2025

(54) BRUSHLESS DRIVE SYSTEM FOR A ROTARY ANODE ARRANGEMENT OF AN X-RAY TUBE

(71) Applicant: Siemens Healthcare GmbH, Erlangen (DE)

(72) Inventor: Thomas Weidinger, Erlangen (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 165 days.

(21) Appl. No.: 18/336,509

(22) Filed: Jun. 16, 2023

(65) Prior Publication Data
US 2023/0411107 A1    Dec. 21, 2023

(30) Foreign Application Priority Data
Jun. 20, 2022 (EP) ..................... 22179905

(51) Int. Cl.
*H01J 35/26* (2006.01)
*H01J 35/10* (2006.01)

(52) U.S. Cl.
CPC .......... *H01J 35/26* (2013.01); *H01J 35/1017* (2019.05); *H01J 2235/1033* (2013.01)

(58) Field of Classification Search
CPC .......... H01J 35/10; H01J 35/26; H01J 35/101; H01J 35/1017; H01J 2235/1033; H02K 1/16; H02K 1/17; H02K 21/38; H02K 21/44
See application file for complete search history.

(56) References Cited

U.S. PATENT DOCUMENTS

| | | | |
|---|---|---|---|
| 3,904,902 A | 9/1975 | Inariba | |
| 6,141,401 A | 10/2000 | Gerling | |
| 9,362,786 B2 | 6/2016 | Kou | |
| 9,530,609 B2 * | 12/2016 | Deuringer | H01J 35/101 |
| 9,847,206 B2 * | 12/2017 | Jajtic | H01J 35/103 |
| 2005/0242679 A1 | 11/2005 | Walter et al. | |
| 2010/0123426 A1 | 5/2010 | Nashiki et al. | |
| 2015/0170870 A1 | 6/2015 | Jajtic et al. | |
| 2017/0025909 A1 | 1/2017 | Hummel | |

FOREIGN PATENT DOCUMENTS

| | | |
|---|---|---|
| AU | 3314568 A | 8/1969 |
| DE | 3243243 A1 | 3/1984 |
| DE | 19752114 A1 | 5/1999 |
| DE | 102011077746 A1 | 4/2012 |
| DE | 102012212133 B3 | 7/2013 |

* cited by examiner

*Primary Examiner* — Jurie Yun
(74) *Attorney, Agent, or Firm* — Harness, Dickey & Pierce, P.L.C.

(57) ABSTRACT

A brushless drive system includes a reluctance rotor and a stator for generating a magnetic flux. The stator has a cylindrical stator yoke, an annular permanent magnet and a coil unit. The reluctance rotor has a cylindrical rotor yoke that is made of a soft-magnetic material, is free from magnetic sources and is configured to be driven about an axis of rotation via the magnetic flux. The permanent magnet and the coil unit are axially spaced apart along the axis of rotation. The stator yoke, the permanent magnet, the rotor yoke and the coil unit form a magnetic circuit for guidance of the magnetic flux. The magnetic circuit is configured such that, between the permanent magnet and the coil unit, an axial direction of the magnetic circuit in the stator yoke and an axial direction of the magnetic circuit in the rotor yoke have opposite signs.

20 Claims, 7 Drawing Sheets

BRUSHLESS DRIVE SYSTEM FOR A ROTARY ANODE ARRANGEMENT OF AN X-RAY TUBE

CROSS-REFERENCE TO RELATED APPLICATION(S)

The present application claims priority under 35 U.S.C. § 119 to European Patent Application No. 22179905.9, filed Jun. 20, 2022, the entire contents of which are incorporated herein by reference.

FIELD

One or more example embodiments of the present invention relate to an X-ray tube.

BACKGROUND

Conventional X-ray tubes can in principle be divided into two different categories as regards the mobility of the anode: stationary focal point X-ray tubes and rotary focal point X-ray tubes. A conventional stationary anode X-ray tube typically has an anode which has an immobile focal point, and can hence be referred to as a stationary focal point X-ray tube. Other X-ray tubes with an anode in which the focal point is part of a circular focal path, the latter being created by twisting the anode relative to the electron emitter, can in particular be referred to as rotary focal point or focal path X-ray tubes.

The rotary focal point X-ray tubes can further be divided into two subcategories, wherein in one type of X-ray tube only the anode is mounted so that it can be twisted relative to the electron emitter and the X-ray tube housing and thus in particular can be called a rotary anode X-ray tube and wherein in another type of X-ray tube the anode is arranged so as to be non-rotatable relative to the electron emitter and the X-ray tube housing and thus in particular can be called a rotary piston X-ray tube.

In a conventional rotary anode X-ray tube the rotary anode is driven for example via an asynchronous motor which is fed by an inverter, see for example DE 197 52 114 A1. An asynchronous motor such as this is for example a yoke motor and in particular has a three-phase a.c. stator, for example with a classic distributed winding, and a rotor made of a magnetically conductive material (typically steel) and an electrically conductive material (typically copper). An asynchronous motor such is this is driven via a two- or three-phase inverter and/or directly with a mains connection (in particular a single-phase mains connection). A speed measurement is normally complex and is for example possible via a remanence measurement.

Alternatively to this, the rotary anode can be driven by a synchronous motor, as disclosed for example in the following printed publications: known from DE 10 2011 077 746 A1 is a rotary anode for an X-ray tube, wherein the rotary anode comprises a rotor for driving the rotary anode, wherein at least one permanent magnet is arranged in the rotor, such that a torque is exerted on the permanent magnet by a magnetic field of a stator winding. DE 10 2012 212 133 B3 specifies a rotary anode arrangement with a rotary anode, a rotor for driving the rotary anode and a stator, which exerts a torque on the rotor, wherein the stator comprises at least one coil for generating a first magnetic field and at least one permanent magnet for generating a second magnetic field. The coils and the permanent magnets are arranged along the periphery of the stator housing, wherein each permanent magnet is arranged inside a coil in each case.

SUMMARY

An object of one or more example embodiments of the present invention is basically to specify an X-ray tube with a compact structure, a high power density and/or a high efficiency.

At least this object is achieved by the features of the independent claims and/or example embodiments described herein. More advantageous embodiments are described in the subclaims and the disclosure.

The inventive X-ray tube has
a rotary anode arrangement,
an electron emitter and
an evacuated X-ray tube housing, wherein the reluctance rotor and the electron emitter are arranged inside the X-ray tube housing and the stator is arranged outside the X-ray tube housing.

The stator-side arrangement of the permanent magnet is advantageous, because thereby it is possible to bake out the evacuated X-ray tube housing for the provision of the high vacuum at up to 600° C., without affecting, in particular damaging, a rotor-side permanent magnet of the drive system.

The rotary anode arrangement has
a brushless drive system and
a rotary anode, wherein the rotary anode is non-rotatably connected to the reluctance rotor of the brushless drive system.

The brushless drive system for a rotary anode arrangement has
a stator for generating a magnetic flux and
a reluctance rotor,
wherein the stator has a cylindrical stator yoke, an annular permanent magnet and a coil unit,
wherein the reluctance rotor has a cylindrical rotor yoke made of a soft-magnetic material, free from magnetic sources, can be connected to a rotary anode of the rotary anode arrangement and via the magnetic flux can be driven about an axis of rotation,
characterized in that
the permanent magnet and the coil unit are axially spaced apart along the axis of rotation and in that the stator yoke, the permanent magnet, the rotor yoke and the coil unit form a magnetic circuit for the guidance of the magnetic flux, configured such that between the permanent magnet and the coil unit an axial direction of the magnetic circuit in the stator yoke and an axial direction of the magnetic circuit in the rotor yoke have opposite signs.

One form of embodiment provides that the stator has a further annular permanent magnet, wherein the coil unit is arranged centrally between the permanent magnet and the further permanent magnet and is axially spaced apart from the permanent magnet and the further permanent magnet. In this form of embodiment a drive power of the drive system is advantageously increased.

One form of embodiment provides that the rotor yoke is designed to accommodate a bearing. This form of embodiment is in particular advantageous because a bearing holds the rotor yoke at a defined distance from the stator.

One form of embodiment provides that the rotor yoke is designed to be hollow in order to accommodate the bearing. The embodiment of a hollow rotor yoke in particular offers a weight advantage and consequently a cost advantage. A lower weight is typically associated with a reduced inertia of the reluctance rotor.

One form of embodiment provides that the rotor yoke is designed to accommodate the bearing on the end face.

One form of embodiment provides that the coil unit has multiple coils, which in particular are wound along the periphery of the stator yoke about stator tooth poles of the stator yoke.

One form of embodiment provides that the multiple coils of the coil unit are wound in a concentrated or distributed manner.

One form of embodiment provides that the multiple coils of the coil unit form a three-phase motor winding.

One form of embodiment provides that the brushless drive system has a control unit (also referred to as a controller) to energize the multiple coils of the coil unit in the manner of a brushless direct current motor.

One form of embodiment provides that the brushless drive system has an inverter which is connected upstream of the coil unit to energize the multiple coils of the coil unit with alternating voltage.

One form of embodiment provides that the rotor yoke has lateral recesses in the cylindrical lateral surface for the creation of at least one rotor pole pair.

One form of embodiment provides that the rotor yoke is designed in one piece.

One form of embodiment provides that the reluctance rotor is an internal rotor.

One form of embodiment provides that the permanent magnet and the coil unit are arranged on an interior side of the lateral surface of the stator yoke.

One form of embodiment provides that the multiple coils form at least two, preferably six three-phase a.c. windings.

One advantage of the brushless drive system is that the permanent magnet generates at least part of the magnetic flux and thus on energization the multiple coils generate only a further part of the magnetic flux. As a result, the efficiency advantageously increases, wherein simultaneously lower losses occur than if only energized coils generate the magnetic flux.

The brushless drive system is furthermore advantageous because the reluctance rotor is comparatively simple and/or compact in structure. The reluctance rotor can in particular consist of a soft-magnetic material, for example steel or stainless steel, which is typically associated with a cost advantage. Preferably no magnetic reversal losses and/or eddy current losses occur in the reluctance rotor.

Because of the comparatively lower efficiency and the comparatively higher losses of conventional anode drive systems, in particular a usable proportion of the overall power is in some cases considerably restricted. The losses of a conventional drive system such as this are typically in the order of magnitude of the losses of the X-ray tube assembly generation on the anode. With the brushless drive system a higher proportion of the overall power can be used, for example for operation of the X-ray tube during X-ray tube assembly generation. A reduction in the losses typically considerably increases the performance of the X-ray tube.

A further advantage of the brushless drive system relates to the arrangement of the permanent magnet on the stator, which in particular in operation as part of a rotary anode arrangement is significantly cooler than the reluctance rotor. In particular, if the rotary anode is connected to the reluctance rotor, a large part of the energy absorbed in the focal point is dissipated as heat via the reluctance rotor, wherein in a conventional X-ray tube this heat can damage a permanent magnet arranged on the rotor. Typical permanent magnets are frequently temperature-resistant only up to 300° C.

Because two materials are used for the rotor in a conventional anode drive, e.g. copper and steel, very high manufacturing and material costs can be incurred in some cases, depending on the embodiment. A simple reluctance rotor structure can hence also entail a significant reduction in costs.

It is furthermore advantageous that in the case of the brushless drive system a speed controller is integrated and thus it is possible to dispense with an estimation of the speed, as is normal in many conventional drive systems. The speed of the reluctance rotor can preferably be monitored, e.g. for diagnostic purposes, in order to detect wear and tear or a defect in the brushless drive system, in particular a defect in the bearing.

BRIEF DESCRIPTION OF THE DRAWINGS

The present invention is described and explained in greater detail below on the basis of the exemplary embodiments represented in the figures. Structures and units that remain essentially identical are in principle referred to in the following description of the figures by the same reference character as is used for the first occurrence of the respective structure or unit.

In the drawings.

DETAILED DESCRIPTION

Figure 1:
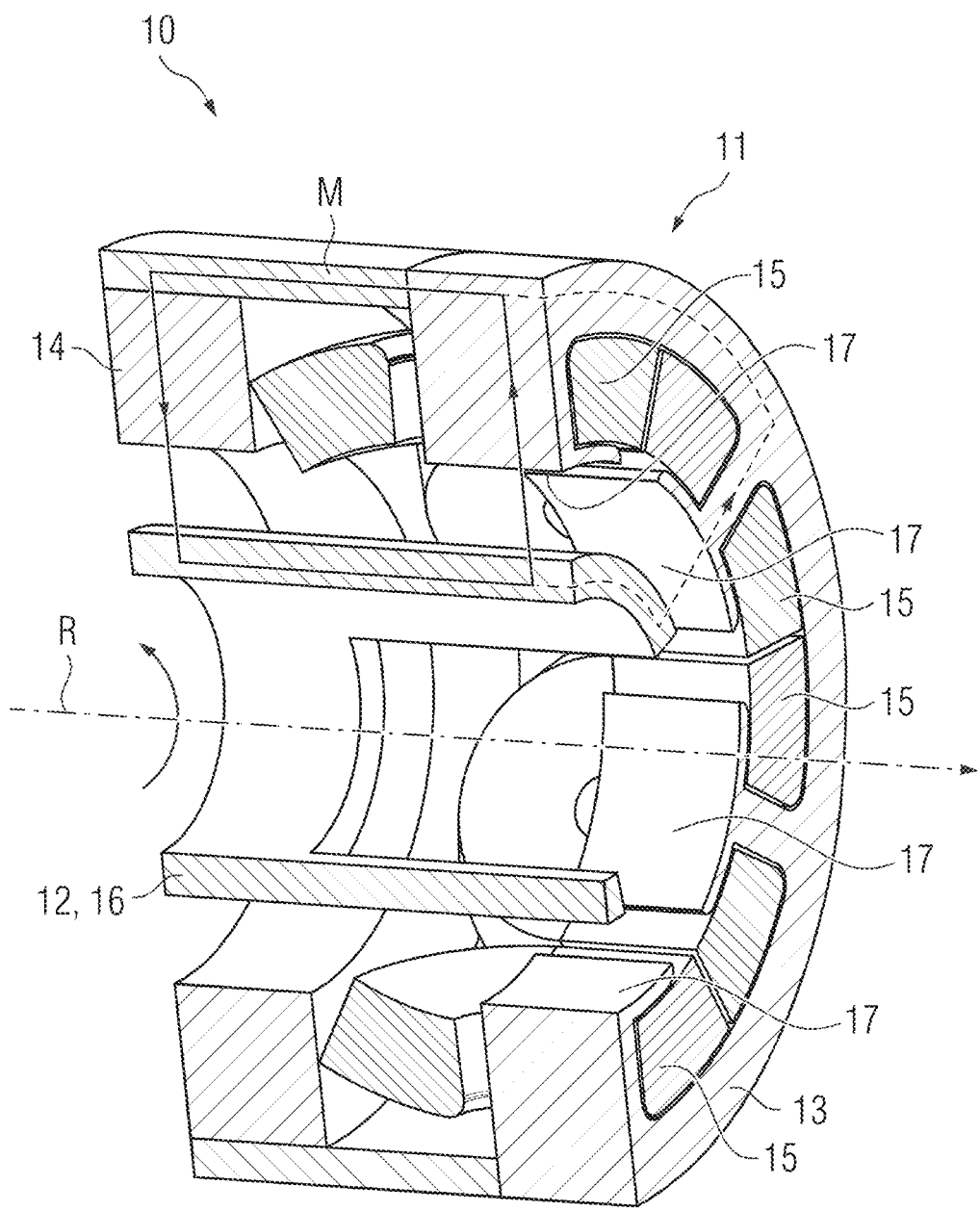
FIG. 1 shows a brushless drive system.

FIG. 1 shows a sectional view of a brushless drive system 10 in a perspective view. The sectional cutting edges of the sectional view are firstly along the axis of rotation R of the drive system 10 and secondly perpendicular to the axis of rotation R on the coil unit 15.

The brushless drive system 10 is designed for a rotary anode arrangement. The brushless drive system 10 can in particular be used to drive a rotary anode arrangement. The brushless drive system 10 is in particular an encoderless drive system.

The brushless drive system 10 for a rotary anode arrangement has a stator 11 for generating a magnetic flux and a reluctance rotor 12. The stator 11 and the reluctance rotor 12 in particular form a permanently excited synchronous machine or a permanently excited synchronous motor.

The stator 11 has a cylindrical stator yoke 13, an annular permanent magnet 14 and a coil unit 15. An external shape of the stator 11 is in particular cylindrical. The annular permanent magnet 14 in particular has a central recess, in order for example to be able to enclose the stator yoke 13 and/or the reluctance rotor 12.

In this exemplary embodiment the coil unit 15 has multiple coils wound along the periphery of the stator yoke 13 about stator tooth poles 17 of the stator yoke 13. The multiple coils are in particular arranged on a single axis intersect of the axis of rotation R annularly about the axis of rotation R. In this exemplary embodiment the multiple coils are wound in a concentrated manner. Alternatively, the multiple coils can be wound in a distributed manner. The multiple coils in particular form a three-phase motor winding and/or three-phase a.c. windings. The multiple coils are typically arranged along the lateral surface of the cylindrical stator yoke 13. The stator tooth poles 17 are frequently arranged along the periphery or the lateral surface of the stator yoke 13.

The permanent magnet 14 and the coil unit 15 are axially spaced apart along the axis of rotation R. The permanent magnet 14 and the coil unit 15 are arranged on an interior side of the lateral surface of the stator yoke 13. Alternatively, the permanent magnet 14 and the coil unit 15 can be arranged on an external side of the lateral surface of the stator yoke 13.

The reluctance rotor 12 has a cylindrical rotor yoke 16 made of a soft-magnetic material, is free from magnetic sources, can be connected to a rotary anode of the rotary anode arrangement and can be driven about the axis of rotation R via the magnetic flux. The stator 11 in particular generates a magnetic field rotating about the axis of rotation R by energizing the coil unit 15 together with the permanent magnet 14, said magnetic field exerting a torque on the reluctance rotor 12 and thus driving the reluctance rotor 12 synchronously about the axis of rotation R. The reluctance rotor 12 is in particular designed for a magnetic return. The reluctance rotor 12 is for example as a result free from magnetic sources, if the reluctance rotor 12 in particular has no rotor-side coil unit and/or no rotor-side permanent magnet.

The stator yoke 13, the permanent magnet 14, the rotor yoke 16 and the coil unit 15 form a magnetic circuit M for the guidance of the magnetic flux, configured such that between the permanent magnet 14 and the coil unit 15 an axial direction of the magnetic circuit M in the stator yoke 13 and an axial direction of the magnetic circuit M in the rotor yoke 16 have opposite signs. In other words, a radial direction of the magnetic circuit M in the permanent magnet 14 and a radial direction of the magnetic circuit M in the coil unit 15 typically have opposite signs between the stator yoke 13 and the rotor yoke 16. The magnetic flux is in particular guided along the magnetic circuit M through the stator yoke 13, the permanent magnet 14, the rotor yoke 16 and the coil unit 16. The magnetic circuit M is schematically indicated as a self-contained circuit with arrows in the figures. Guidance of the magnetic flux such as this requires a particular direction of magnetization of the permanent magnet 14. The direction of magnetization of the permanent magnet 14 can of course be altered or another permanent magnet with a reversed direction of magnetization can be used and thus also the direction of the magnetic flux along the magnetic circuit M can be reversed.

The magnetic circuit M in particular has paths parallel to the axis of rotation R and perpendicular to the axis of rotation R. The paths parallel to the axis of rotation R occur in particular because of the permanent magnet 14 and the coil unit 15 being spaced apart. The magnetic flux is in particular guided radially and axially in operation of the brushless drive system 10. The brushless drive system is in particular a combined axial flux and radial flux machine. A commutation of the magnetic flux takes place in particular thanks to the reluctance structure of the reluctance rotor 12. The rotor yoke 16 is in particular used to transfer the magnetic flux between stator 11 and reluctance rotor 16.

The magnetic circuit M can in particular be a parallel connection of multiple magnetic circuits. The parallel connection can occur in that typically the magnetic flux is guided radially at each stator tooth pole 17 and thus the stator tooth poles 17 spaced apart from one another cause the magnetic circuit M to be split into the parallel connection of multiple magnetic circuits.

The direction of the magnetic circuit M is typically reversible, for example by reversing the energization. In principle it is conceivable that the radial direction of the magnetic circuit M within the coil unit 15 can be represented in parallel by a corresponding energization transferred into an equivalent circuit diagram.

In this exemplary embodiment the multiple coils of the coil unit 15 form six three-phase a.c. windings, which can be energized on the stator side for the generation of the rotating magnetic field and four of which are shown at least partially in FIG. 1. The number of three-phase a.c. windings can alternatively be less or more than six. The multiple coils are typically associated with a phase in pairs.

In this exemplary embodiment the reluctance rotor 12 is an internal rotor. Alternatively, the reluctance rotor 12 can be an external rotor.

Figure 2:
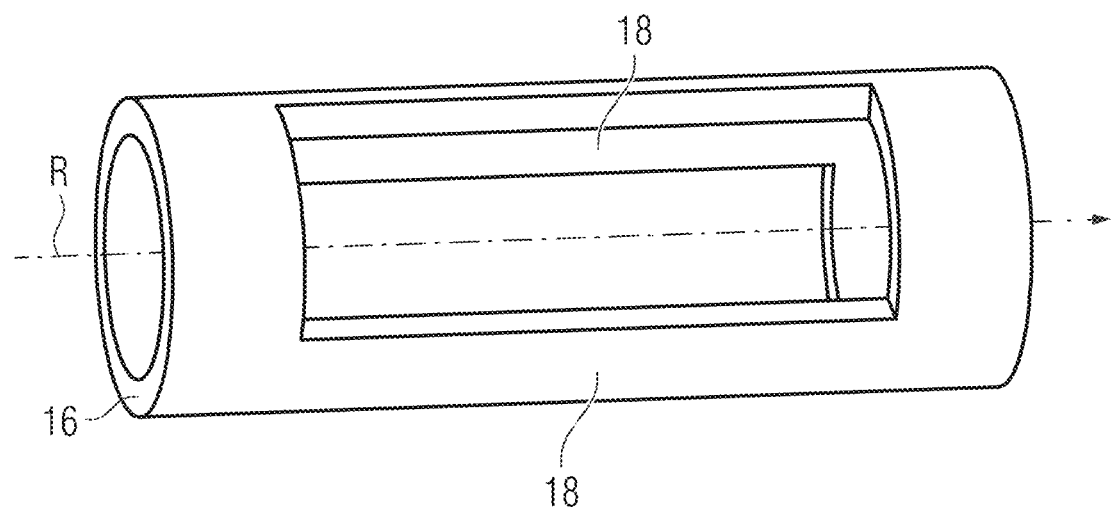
FIG. 2 shows a rotor yoke.

FIG. 2 shows the rotor yoke 16 in a perspective view.

In this exemplary embodiment the rotor yoke 16 is designed to be hollow to accommodate a bearing 20 (not shown). Alternatively, the rotor yoke 16 can be constructed to be solid. Alternatively, the bearing 20 can be accommodated on the end face of the rotor yoke 16. The rotor yoke 16 can for example comprise a flange, to which the bearing 20 can be non-rotatably fastened. The bearing 20 can in particular be a liquid metal plain bearing or a ball bearing. The connection of the bearing 20 and of the rotor yoke 16 is typically non-rotatable and/or detachable.

Alternatively or additionally, the rotary anode of the rotary anode arrangement can be connected to the rotor yoke 16 via a flange. The rotary anode can in particular be non-rotatably connected to the rotor yoke 16 and/or can be fastened to the rotor yoke 16.

The rotor yoke 16 can be in one piece or laminated. A one-piece rotor yoke 16 is frequently referred to as a solid rotor yoke. The soft-magnetic material of the rotor yoke 16 can in particular be a magnetic sheet steel or a dynamo sheet or an SMC material. In particular, the rotor yoke 16 can consist of steel or a stainless steel.

The rotor yoke 16 has a structuring for the creation of a rotor pole pair 18. The structuring can in particular take the form of lateral recesses in the direction of rotation. In this case the rotor yoke 16 has the lateral recesses in the cylindrical lateral surface for the creation of the at least one rotor pole pair 18. The recess is in particular a cutout. Alternatively to the exemplary embodiment shown in FIG. 2, the number of rotor pole pairs can be greater than 1.

Figure 3:
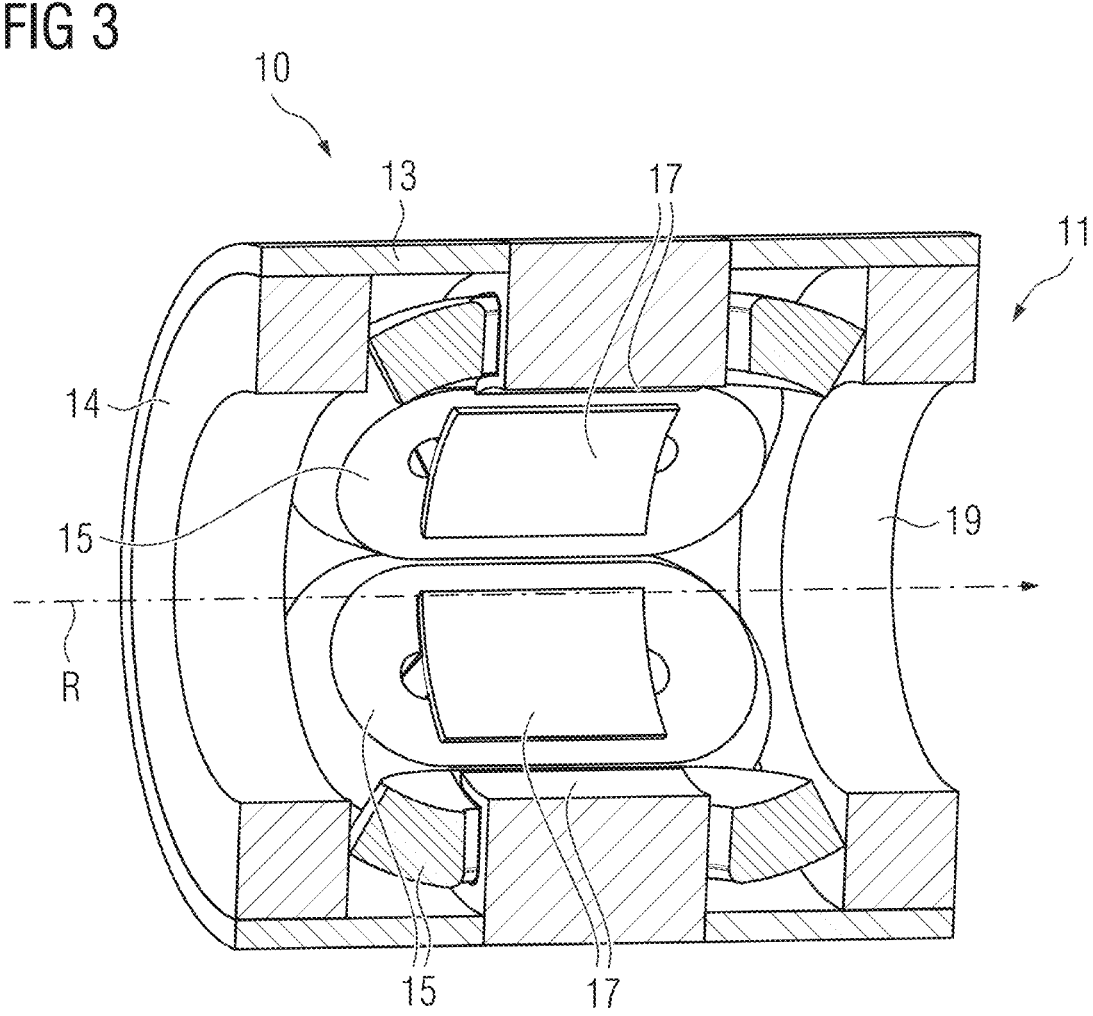
FIG. 3 shows the brushless drive system in a first exemplary embodiment.

FIG. 3 shows in a perspective view a sectional representation of the brushless drive system 10 in a first exemplary embodiment. The sectional cutting edge is along the axis of rotation R.

The stator 12 has a further annular permanent magnet 19. The coil unit 15 is arranged centrally between the permanent magnet 14 and the further permanent magnet 19. The coil unit 15 is axially spaced apart from the permanent magnet 14 and the further permanent magnet 19. The spacing from the coil unit 15 to the permanent magnet 14 or to the further permanent magnet 19 is typically equidistant. The arrangement of the coil unit 15, of the permanent magnet 14 and of the further permanent magnet 19 is in particular symmetrical and/or parallel. The coil unit 15, the permanent magnet 14 and the further permanent magnet 19 are in particular arranged or oriented cylindrically. The permanent magnet 14 and the further permanent magnet 19 are in particular identical in construction and/or identical, in particular in respect of magnetization.

Figure 4:
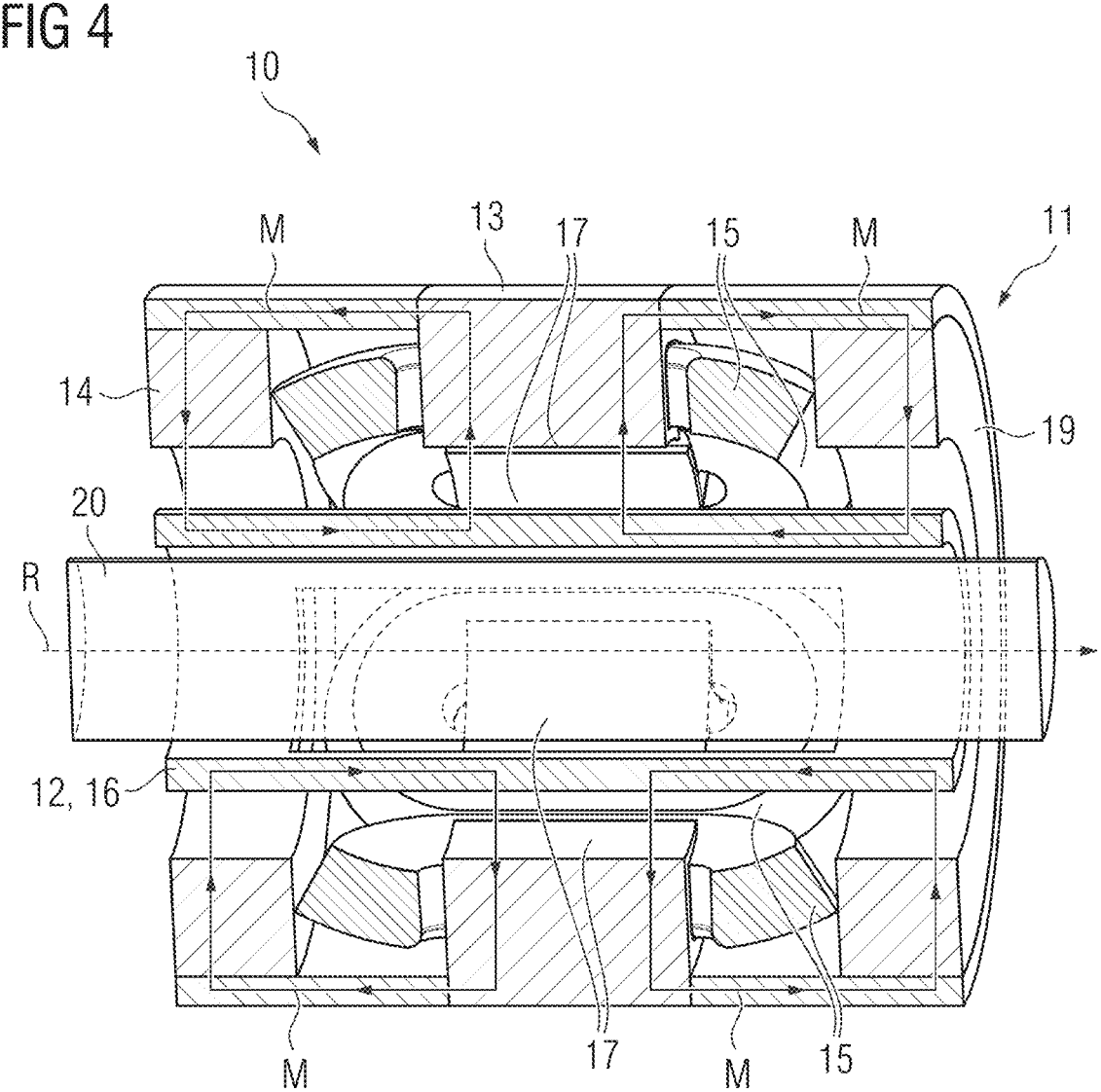
FIG. 4 shows the first exemplary embodiment of the brushless drive system in a further view.

FIG. 4 shows the brushless drive system 10 from FIG. 3 in a further view.

FIG. 4 additionally shows the reluctance rotor 12 with the rotor yoke 16. Furthermore, in FIG. 4 the paths of the four highlighted magnetic circuits M are represented, each of which are configured separately, such that between the permanent magnet 14 or the further permanent magnet 19 and the coil unit 15 an axial direction of the magnetic circuit M in the stator yoke 13 and an axial direction of the magnetic circuit M in the rotor yoke 16 have opposite signs. In this exemplary embodiment the rotor yoke 16 is designed to be hollow in order to accommodate a bearing 20 and has lateral recesses in the cylindrical lateral surface for the creation of at least one rotor pole pair 18. For reasons of clarity, the bearing 20 is represented in FIG. 4 as partially transparent. A material and/or a structure of such a bearing 20 is not routinely transparent or semitransparent.

Figure 5:
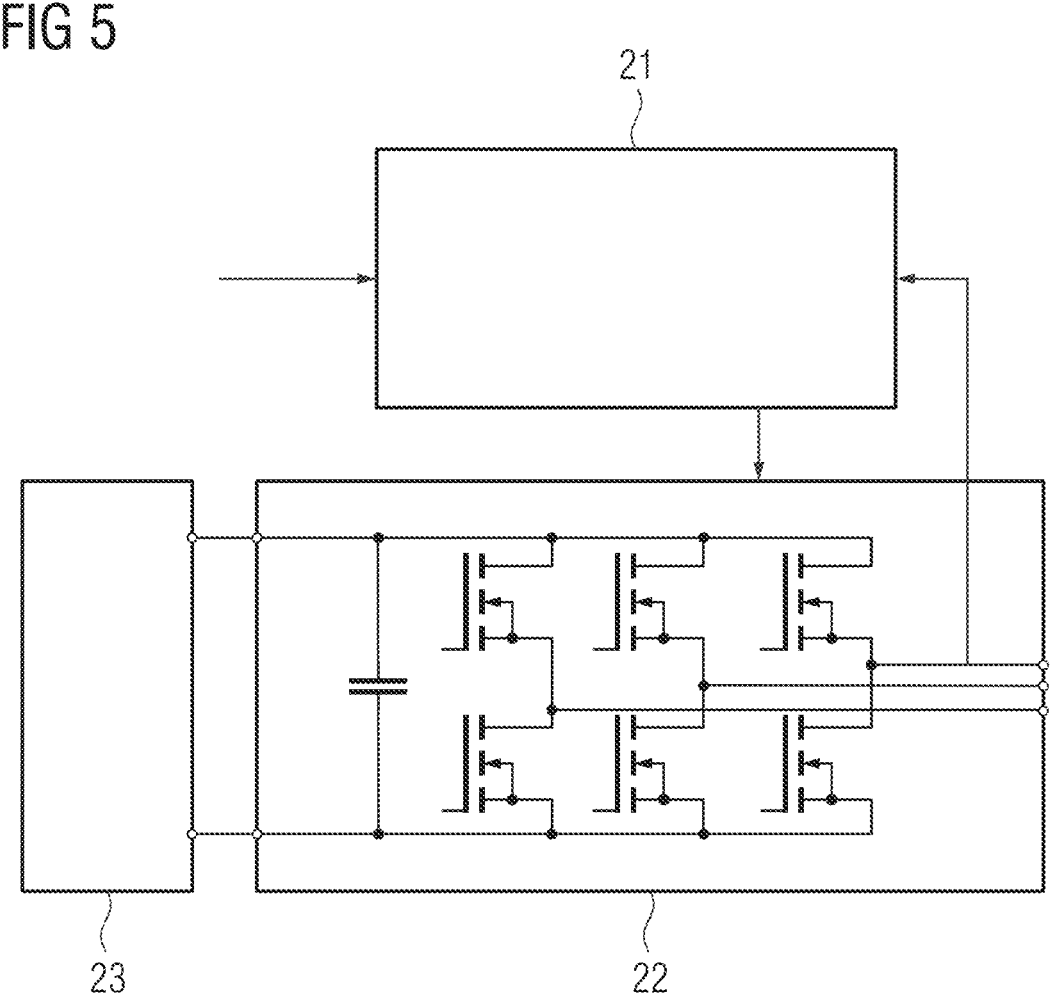
FIG. 5 shows a controller of the brushless drive system.

FIG. 5 shows an equivalent circuit diagram of a controller of the brushless drive system 10 in a second exemplary embodiment.

The brushless drive system 10 has a control unit 21 and an inverter 22. The inverter 22 in particular has transistors for converting the direct current at the input into an alternating voltage at the output.

For energizing the multiple coils the control unit 21 is designed in the manner of a brushless direct current motor. Various encoderless control methods are in principle possible, in particular block-type operation with zero crossing detection in the non-energized phase. For this, the control unit 21 is typically connected to the inverter 22 for control of the inverter 22.

The control unit 21 can in particular switch the inverter 22, in particular the transistors, via switching signals, in order to generate the alternating voltage. In this exemplary embodiment the inverter 22 has a three-phase output, in order to energize the multiple coils of the coil unit 15 (not shown in FIG. 5). The inverter 22 is typically connected upstream of the coil unit 15, to be able to energize the multiple coils of the coil unit 15 with alternating voltage.

The control unit 21 can have an input, in order to receive a measured value that maps a stator voltage and/or a stator current and/or a stator frequency of one or more phases of the output of the inverter 22. The control unit 21 can have a further input, in order to receive a setpoint value of the stator voltage and/or of the stator current and/or of a stator frequency.

A direct current source 23 is advantageously connected upstream of the inverter 22. The direct current source 23 in particular provides a direct voltage of less than 400 V or 230 V, for example 24 V or 48 V. The inverter 22 is fed by the direct current source 23.

Figure 6:
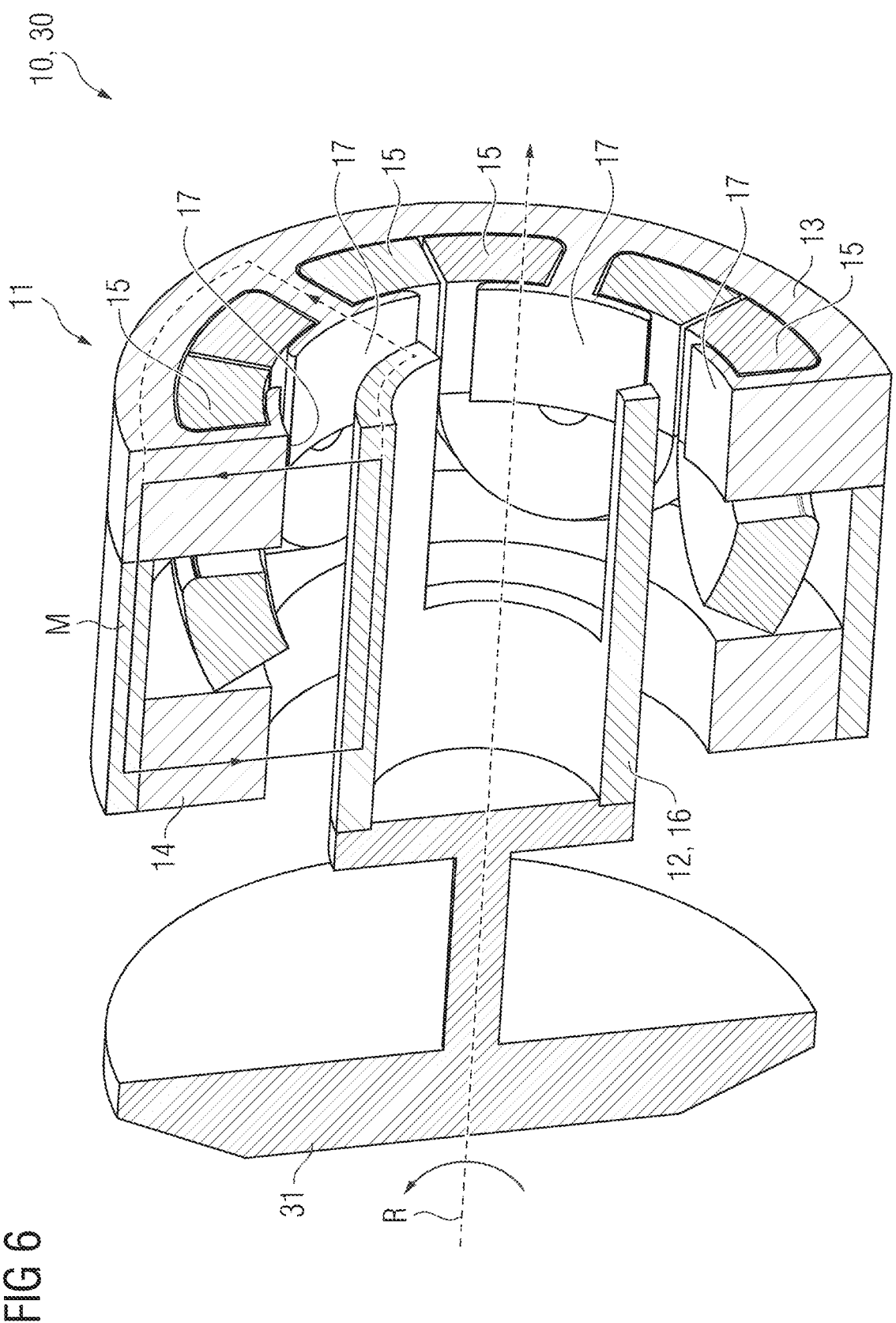
FIG. 6 shows a rotary anode arrangement.

FIG. 6 shows a sectional representation of a rotary anode arrangement 30 in a perspective view.

The rotary anode arrangement 30 has a brushless drive system 10, as shown for example in FIG. 1, and a rotary anode 31. The rotary anode 31 is non-rotatably connected to the reluctance rotor 16. The rotary anode 31 can be coupled directly to the reluctance rotor 16 and/or to a bearing 20 (not shown). The rotary anode 31 can in particular be fastened to the reluctance rotor 16 and/or to the bearing 20 (not shown).

The front side of the rotary anode 31 facing away from the brushless drive system 10 is designed to generate X-ray radiation as a function of the electrons arriving at a focal point. In the rotary anode 31 the focal point is in particular part of a focal path, which can occur thanks to the rotation of the rotary anode 31 about the axis of rotation R. The rotation of the rotary anode 31 advantageously enables a higher stroke temperature and thus a higher electron flow on the surface of the front side. The front side of the rotary anode in particular has tungsten and/or molybdenum in the region of the focal point and/or of the focal path.

The rotary anode 31 has an anode plate. The anode plate normally has an anode angle of greater than 0°. The reverse of the rotary anode 31 facing the brushless drive system 10 can have a structure that enlarges the surface. On the reverse the rotary anode 31 for example has graphite for cooling the front side.

Figure 7:
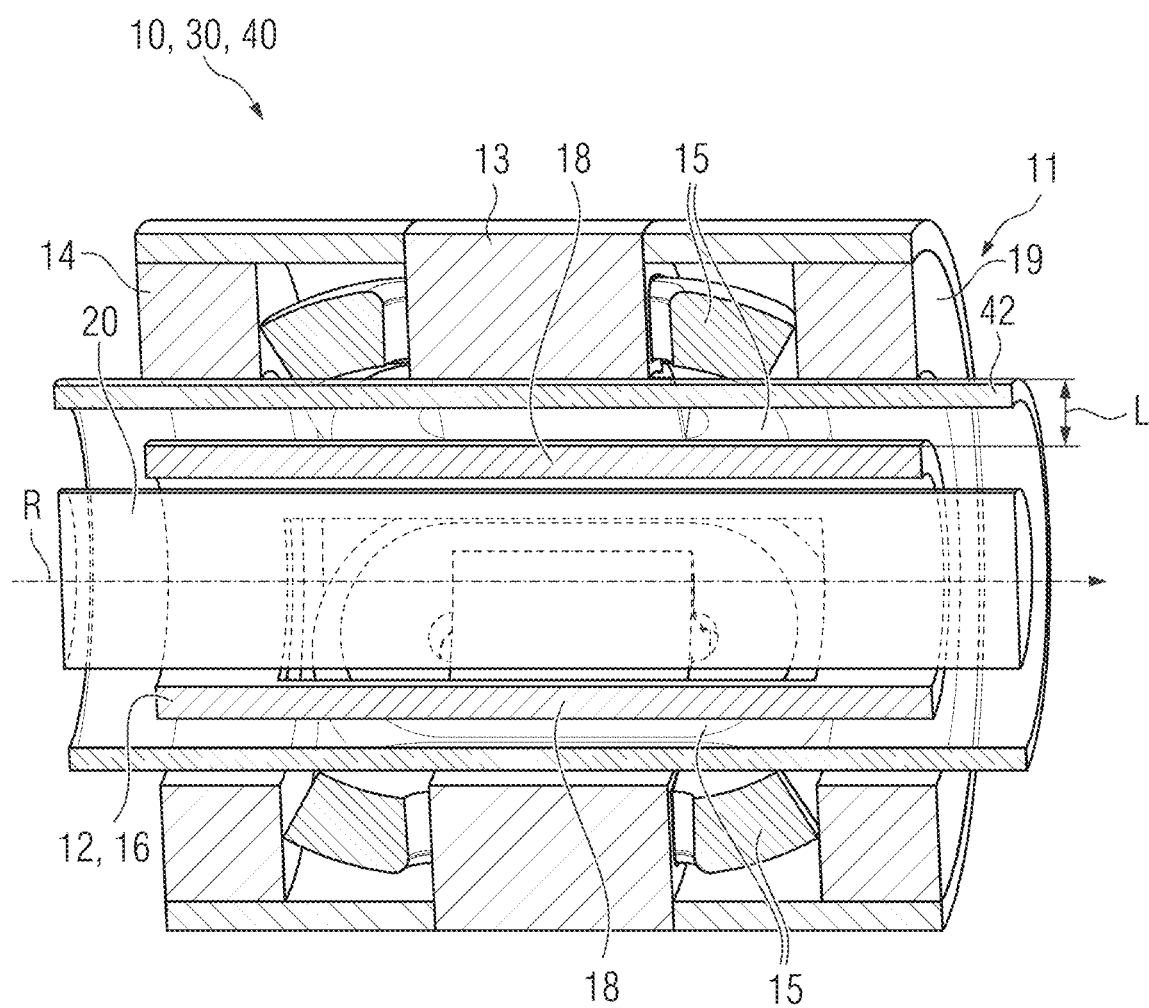
FIG. 7 shows an inventive X-ray tube.

FIG. 7 shows a sectional view of an inventive X-ray tube 40 in a perspective view.

The X-ray tube 40 has a rotary anode arrangement 30, an electron emitter and an evacuated X-ray tube housing 42. For reasons of clarity, the rotary anode 31 is not shown in FIG. 7.

The reluctance rotor 12 and the electron emitter are arranged inside the X-ray tube housing 42. The stator 11 is arranged outside the X-ray tube housing 42. The evacuated X-ray tube housing 42 can comprise glass and/or metal. In particular in the region of the brushless drive system 10 the evacuated X-ray tube housing 42 preferably has glass, because metal, depending on configuration, can affect the magnetic flux. The evacuated X-ray tube housing 42 therefore in particular has a glass piston, which is arranged in an airgap L between the stator 11 and the reluctance rotor 12. In FIG. 7 the glass piston of the X-ray tube housing 42 is substantially represented in a sectional view. The evacuated X-ray tube housing 42 is typically surrounded by a coolant and also surrounds the electron emitter and the rotary anode 31 outside the glass piston in a vacuum-tight manner.

The X-ray tube 40 is designed for an imaging examination of a patient. Alternatively, the X-ray tube 40 can be provided for material testing. The imaging examination can be angiography, computed tomography, mammography or radiography.

The electron emitter is designed to generate a focal point on the rotary anode 31 via electrons. The electron emitter can have a field-effect emitter or a thermionic emitter. The thermionic emitter can be a helical emitter or a flat emitter.

The electron emission in the case of the field-effect emitter is typically effected by applying a gate voltage, which extracts the electrons from nano-tubes thanks to the electrical field occurring in the tips of said nano-tubes, as a result of which the electron flow is formed. In addition to switching via the gate voltage it is possible to block a generated electron flow via a barrier grid. The field-effect emitter typically has a plurality of nano-tubes, for example made of carbon or silicon or molybdenum.

The emitted electrons are accelerated by the electron emitter in the direction of the anode 31 and generate the X-ray radiation during the interaction at the focal point. The generated X-ray radiation normally has a maximum energy of up to 150 keV as a function of the acceleration voltage applied between the electron emitter and the anode 31.

It will be understood that, although the terms first, second, etc. May be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, Ocaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been illustrated and described in greater detail by the preferred exemplary embodiments, the present invention is nevertheless not restricted by the disclosed examples and other variations can be derived therefrom by the person skilled in the art, without departing from the scope of protection of the present invention.

What is claimed is:

1. An X-ray tube comprising:
an electron emitter;
an evacuated X-ray tube housing; and
a rotary anode arrangement, the rotary anode arrangement including
 a rotary anode, and
 a brushless drive system, the brushless drive system including
  a stator for generating a magnetic flux, the stator including a cylindrical stator yoke, an annular permanent magnet, and a coil unit, and
  a reluctance rotor, wherein the reluctance rotor has a cylindrical rotor yoke made of a soft-magnetic material, is free from magnetic sources, is configured to be connected to the rotary anode of the rotary anode arrangement, and is configured to be driven about an axis of rotation via the magnetic flux, wherein
   the rotary anode is non-rotatably connected to the reluctance rotor,
   the annular permanent magnet and the coil unit are axially spaced apart along the axis of rotation,
   the cylindrical stator yoke, the annular permanent magnet, the cylindrical rotor yoke and the coil unit form a magnetic circuit for guidance of the magnetic flux, the magnetic circuit configured such that, between the annular permanent magnet and the coil unit, an axial direction of the magnetic circuit in the cylindrical stator yoke and an axial direction of the magnetic circuit in the cylindrical rotor yoke have opposite signs, and
   the reluctance rotor and the electron emitter are arranged inside the evacuated X-ray tube housing and the stator is arranged outside the evacuated X-ray tube housing.

2. The X-ray tube as claimed in claim 1,
wherein the stator has a further annular permanent magnet, and
wherein the coil unit is arranged centrally between the annular permanent magnet and the further annular permanent magnet, and the coil unit is axially spaced apart from the annular permanent magnet and the further annular permanent magnet.

3. The X-ray tube as claimed in claim 2,
wherein the coil unit includes multiple coils along a periphery of the cylindrical stator yoke wound about stator tooth poles of the cylindrical stator yoke.

4. The X-ray tube as claimed in claim 3,
wherein the cylindrical rotor yoke has lateral recesses in a cylindrical lateral surface to create at least one rotor pole pair.

5. The X-ray tube as claimed in claim 3,
wherein the brushless drive system includes a controller configured to energize the multiple coils of the coil unit in the manner of a brushless direct current motor.

6. The X-ray tube as claimed in claim 3,
wherein the brushless drive system includes an inverter that is connected upstream of the coil unit, the inverter configured to energize the multiple coils of the coil unit with alternating voltage.

7. The X-ray tube as claimed in claim 1,
wherein the cylindrical rotor yoke is hollow and configured to accommodate a bearing.

8. The X-ray tube as claimed in claim 1,
wherein the cylindrical rotor yoke is configured to accommodate a bearing on an end face.

9. The X-ray tube as claimed in claim 1,
wherein the coil unit includes multiple coils along a periphery of the cylindrical stator yoke wound about stator tooth poles of the cylindrical stator yoke.

10. The X-ray tube as claimed in claim 9,
wherein the multiple coils of the coil unit form a three-phase motor winding.

11. The X-ray tube as claimed in claim 9,
wherein the brushless drive system includes a controller configured to energize the multiple coils of the coil unit in the manner of a brushless direct current motor.

12. The X-ray tube as claimed in claim 9,
wherein the brushless drive system includes an inverter that is connected upstream of the coil unit, the inverter configured to energize the multiple coils of the coil unit with alternating voltage.

13. The X-ray tube as claimed in claim 5,
wherein the multiple coils of the coil unit form at least two three-phase a.c. windings.

14. The X-ray tube as claimed in claim 13,
wherein the multiple coils of the coil unit form six three-phase a.c. windings.

15. The X-ray tube as claimed in claim 9,
wherein the reluctance rotor is an internal rotor.

16. The X-ray tube as claimed in claim 15,
wherein the annular permanent magnet and the coil unit are arranged on an interior side of a lateral surface of the cylindrical stator yoke.

17. The X-ray tube as claimed in claim 1,
wherein the cylindrical rotor yoke has lateral recesses in a cylindrical lateral surface to create at least one rotor pole pair.

18. The X-ray tube as claimed in claim 1,
wherein the cylindrical rotor yoke is designed in one piece.

19. The X-ray tube as claimed in claim 1,
wherein the reluctance rotor is an internal rotor.

20. The X-ray tube as claimed in claim 19,
wherein the annular permanent magnet and the coil unit are arranged on an interior side of a lateral surface of the cylindrical stator yoke.

* * * * *